(12) United States Patent
Uchida et al.

(10) Patent No.: US 7,619,849 B2
(45) Date of Patent: Nov. 17, 2009

(54) MAGNETIC DISK DRIVE WITH CONTROLLED TRANSDUCER MOVEMENT DURING A SEEK

(75) Inventors: Hiroshi Uchida, Kanagawa (JP); Isao Yoneda, Kanagawa (JP); Hideki Ohzeki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/796,228

(22) Filed: Apr. 26, 2007

(65) Prior Publication Data

US 2007/0253100 A1    Nov. 1, 2007

(30) Foreign Application Priority Data

Apr. 26, 2006    (JP) .............................. 2006-122691

(51) Int. Cl.
    *G11B 5/596*    (2006.01)
(52) U.S. Cl. .................. 360/78.07; 360/78.06; 388/842
(58) Field of Classification Search ....................... None
    See application file for complete search history.

(56) References Cited

U.S. PATENT DOCUMENTS

| | | | |
|---|---|---|---|
| 4,937,689 A * | 6/1990 | Seaver et al. ............. | 360/78.07 |
| 5,111,349 A * | 5/1992 | Moon ...................... | 360/78.07 |
| 5,119,250 A | 6/1992 | Green et al. | |
| 5,696,647 A | 12/1997 | Phan et al. | |
| 6,178,060 B1 * | 1/2001 | Liu ......................... | 360/78.07 |
| 6,724,564 B1 * | 4/2004 | Codilian et al. .......... | 360/78.07 |
| 6,865,055 B1 | 3/2005 | Ou-Yang et al. | |
| 6,989,957 B2 | 1/2006 | Hamada et al. | |
| 7,359,140 B2 * | 4/2008 | Chung ..................... | 360/78.06 |
| 2003/0189784 A1 * | 10/2003 | Galloway ................ | 360/78.06 |
| 2007/0253099 A1 * | 11/2007 | Derosa et al. ............ | 360/78.06 |

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments in accordance with the present invention provide a magnetic disk drive with reduced noise during seek operation without causing any delay in control response. According to one embodiment of the present invention, a control circuit of a magnetic disk drive controls the drive power supplied to a voice coil motor during a seek operation adapted to move a magnetic head over a target track formed on a magnetic disk so as to bring the travel speed of the magnetic head close to a predetermined target speed. The control circuit determines a provisional current according to the difference between the predetermined target speed and an actual travel speed in an acceleration zone adapted to accelerate the magnetic head to the predetermined target speed. If the provisional current exceeds a limit specified in relation to an elapsed time from the start of acceleration, the control circuit sets the limit as the current of the drive power supplied to the voice coil motor to control the motor.

3 Claims, 7 Drawing Sheets

(a)

(b)

MAGNETIC DISK DRIVE WITH CONTROLLED TRANSDUCER MOVEMENT DURING A SEEK

CROSS-REFERENCE TO RELATED APPLICATION

The instant nonprovisional patent application claims priority to Japanese Application No. 2006-122691, filed Apr. 26, 2006 and incorporated by reference in its entirety herein for all purposes.

BACKGROUND OF THE INVENTION

Magnetic disk drives conventionally employ feedback control of a travel speed of a magnetic head in a seek operation so as to bring the travel speed of the magnetic head close to a predetermined target speed that is determined in advance according to the remaining distance to a target track. That is, a controller adapted to control the magnetic head speed detects the actual travel speed at predetermined time intervals so as to control the drive current of a voice coil motor based on the difference between the actual and target speeds.

FIG. 7($a$) is a graph showing the change of the actual travel speed and target speed of the magnetic head versus seek time. FIG. 7($b$) is a graph showing the change of the drive current of the voice coil motor versus seek time. In FIG. 7($a$), line A represents the change of the actual travel speed, and line B the change of the target speed. At the beginning of the seek time, the drive current of the voice coil motor rises sharply. In response thereto, the magnetic head accelerates to a predetermined target speed Vtarget1. When the actual speed reaches the target speed Vtarget1, the drive current drops to zero, causing the magnetic head to move at the constant target speed Vtarget1. As the magnetic head approaches the target track, a drive current is supplied to the voice coil motor in the opposite direction to that during acceleration. In response, the magnetic head decelerates to reach the target track.

Incidentally, conventional disk drives described above may produce noise due to the abrupt motion of the magnetic head during seek operation. In the examples shown in FIGS. 7($a$) and 7($b$), sharp increases in the drive current at the beginning of seek operation leads to abrupt motion of the magnetic head, thus resulting in a high likelihood of noise. Noise may also be produced at the transition from acceleration to constant speed zones (t1 in FIG. 7($a$)). Further, at the transition from constant speed zone to deceleration zone (t2 in FIG. 7($a$)), the rate of change of the target speed, which is determined to decrease as the remaining distance decreases, is large. As a consequence, the difference (Verror in FIG. 7($a$)) between the target speed Vtarget and the actual travel speed becomes temporarily large. This leads to a sharp rise of the drive current of the voice coil motor at this transition, causing an abrupt magnetic head motion and resulting in a high likelihood of noise. In recent years, magnetic disk drives have found increasing application in audio and other equipment for enjoying music and images. Noise during seek operation has become an issue to deal with in these areas.

For example, in this respect, U.S. Pat. No. 5,696,647 ("Patent Document 1") discloses a magnetic disk drive in which a controller adapted to control a magnetic head outputs a signal, which is adapted to determine a drive current, to a driver circuit of a voice coil motor via a low-pass filter. This suppresses a sharp change in drive current, smoothing the magnetic head motion and reducing noise during seek operation.

However, the magnetic disk drive disclosed in Patent Document 1 exhibits poor control response because the signal from the controller passes through a low-pass filter. This has led to unstable magnetic head speed in the process of transition to constant speed following the termination of acceleration of the magnetic head.

BRIEF SUMMARY OF THE INVENTION

Embodiments in accordance with the present invention provide a magnetic disk drive with reduced noise during seek operation without causing any delay in control response. According to the particular embodiment of FIG. 1, a control circuit 11 of a magnetic disk drive 1 controls the drive power supplied to a voice coil motor 15 during a seek operation adapted to move a magnetic head 14 over a target track formed on a magnetic disk 13 so as to bring the travel speed of the magnetic head 14 close to a predetermined target speed. The control circuit 11 determines a provisional current according to the difference between the predetermined target speed and an actual travel speed in an acceleration zone adapted to accelerate the magnetic head 14 to the predetermined target speed. If the provisional current exceeds a limit specified in relation to an elapsed time from the start of acceleration, the control circuit 11 sets the limit as the current of the drive power supplied to the voice coil motor 15 to control the motor.

DETAILED DESCRIPTION OF THE INVENTION

Embodiments in accordance with the present invention relate to a magnetic disk drive such as hard disk drive and particularly to silencing the same. Embodiments of the present invention have been made in light of the problem discussed above, and it is an object of embodiments in accordance with the present invention to provide a magnetic disk drive with reduced noise during seek operation without aggravating control response.

To solve the above problem, a magnetic disk drive according to embodiments of the present invention includes a magnetic disk and a magnetic head adapted to access a target track formed on the magnetic disk to write or read information.

Further, the magnetic disk drive includes a voice coil motor adapted to produce a drive force applied to the magnetic head and a control circuit adapted to control a drive power supplied to the voice coil motor so as to bring the travel speed of the magnetic head close to a predetermined target speed during a seek operation adapted to move the magnetic head over the target track. The control circuit determines a provisional current or voltage in accordance with the difference between the predetermined target speed and the actual travel speed in an acceleration zone adapted to accelerate the magnetic head to the predetermined target speed. If the provisional current or voltage exceeds a limit determined in relation to the time from the start of acceleration, the control circuit sets the limit as a current or voltage of drive power supplied to the voice coil motor to control the motor.

This makes it possible to suppress a sharp change in current or voltage in the acceleration zone, thus providing reduced noise during seek operation. Further, this ensures fast control response because no low-pass filter is used in the servo feedback loop.

Figure 1:
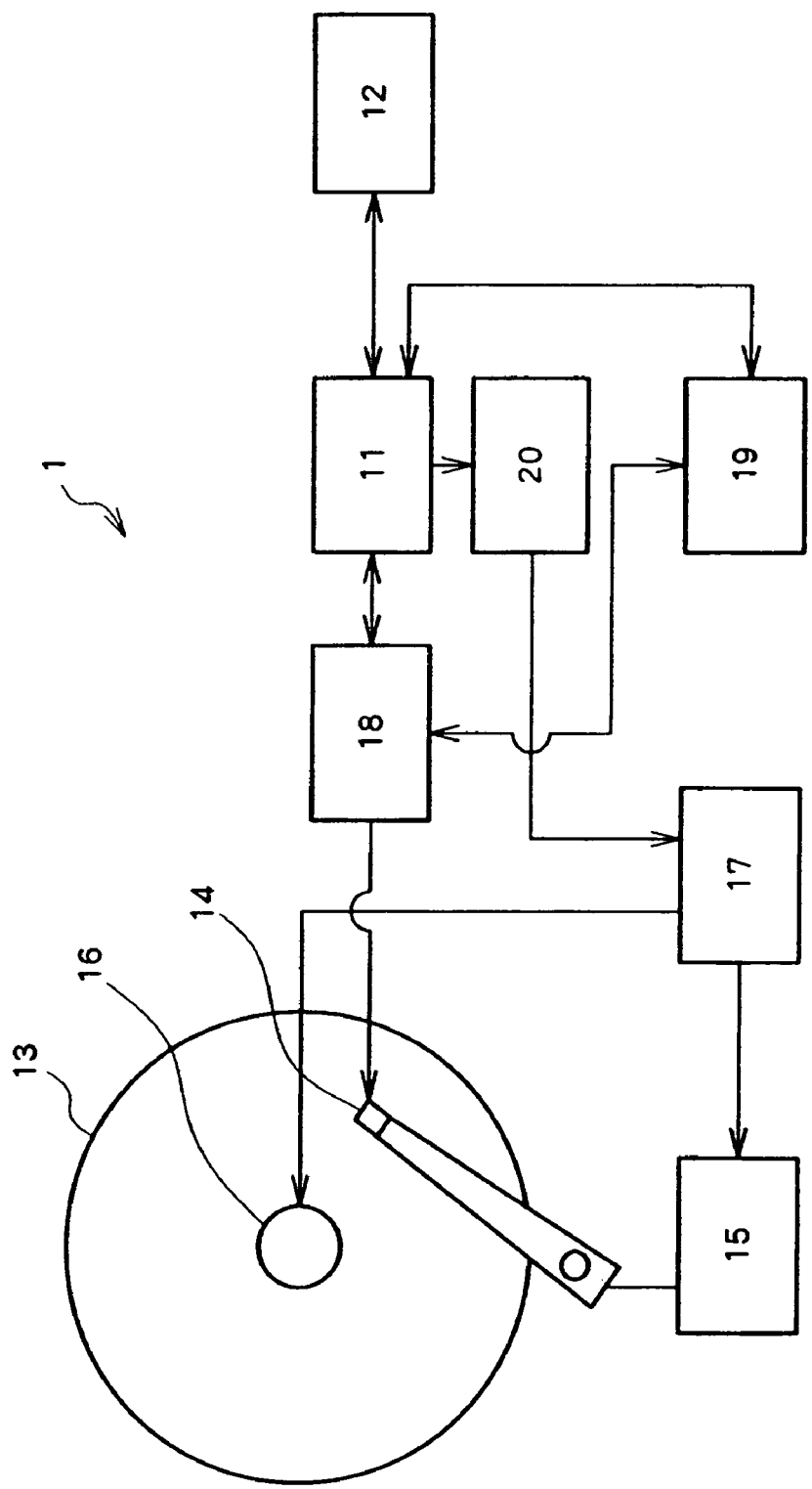
FIG. 1 is a configuration diagram of a magnetic disk drive according to an embodiment of the present invention.

An embodiment of the present invention will be described below with reference to the accompanying drawings. FIG. 1 is a configuration diagram of a magnetic disk drive 1 according to the embodiments of the present invention.

The magnetic disk drive 1 includes a control circuit 11, a memory 12, a magnetic disk 13, a magnetic head 14, a voice coil motor (VCM) 15, a spindle motor 16, a driver circuit 17, a read/write circuit 18, an interface circuit 19 and a digital/analog converter (DAC) 20.

The VCM 15 is driven by a current supplied from the driver circuit 17 and moves the magnetic head 14 over a target track on the magnetic disk 13. The magnetic head 14 accesses the target track on the rotating magnetic disk 13 to magnetically read or write information.

The read/write circuit 18 decodes data read by the magnetic head 14, extracts servo data and outputs the data as position data of the magnetic head 14 to the control circuit 11. Further, when writing data, the read/write circuit 18 encodes user data from the interface circuit 19 and outputs the user data to the magnetic head 14. When reading data, the read/write circuit 18 decodes user data read by the magnetic head 14 and outputs the user data to the interface circuit 19.

The driver circuit 17 applies a drive current commensurate with an input voltage signal from the DAC 20 to the VCM 15.

The control circuit 11 includes a microprocessor and controls the entire operation of the magnetic disk drive 1 in accordance with a program stored in the memory 12. In the present embodiment, the control circuit 11 in particular controls a drive power supplied to the VCM 15 so as to bring the travel speed of the magnetic head 14 close to a predetermined target speed during a seek operation adapted to move the magnetic head 14 over the target track formed on the magnetic disk 13. That is, the control circuit 11 calculates a current of the drive power supplied to the VCM 15 (hereinafter referred to as VCM current) at predetermined intervals and outputs a digital signal representing the VCM current to the DAC 20. The DAC 20 outputs a voltage signal commensurate with the input digital signal to the driver circuit 17. The driver circuit 17 supplies a drive current equal to the calculated VCM current to the VCM 15 based on the input voltage signal. The process performed by the control circuit 11 will be described in detail later.

The memory 12 includes a non-volatile memory and stores a program executed by the control circuit 11.

The interface circuit 19 outputs write destination address information from a host computer to the control circuit 11 and outputs user data to the read/write circuit 18 at the time of data write. Further, the interface circuit 19 outputs read destination address information from the host computer to the control circuit 11 and outputs user data read from the magnetic disk 13 to the host computer at the time of data read. The control circuit 11 determines a target track on the magnetic disk 13 based on the input address information.

It is to be noted that the magnetic disk 13 is driven by the spindle motor 16 to rotate at constant speed. The spindle motor 16 is rotated and driven by power supplied from the driver circuit 17.

Figure 2:
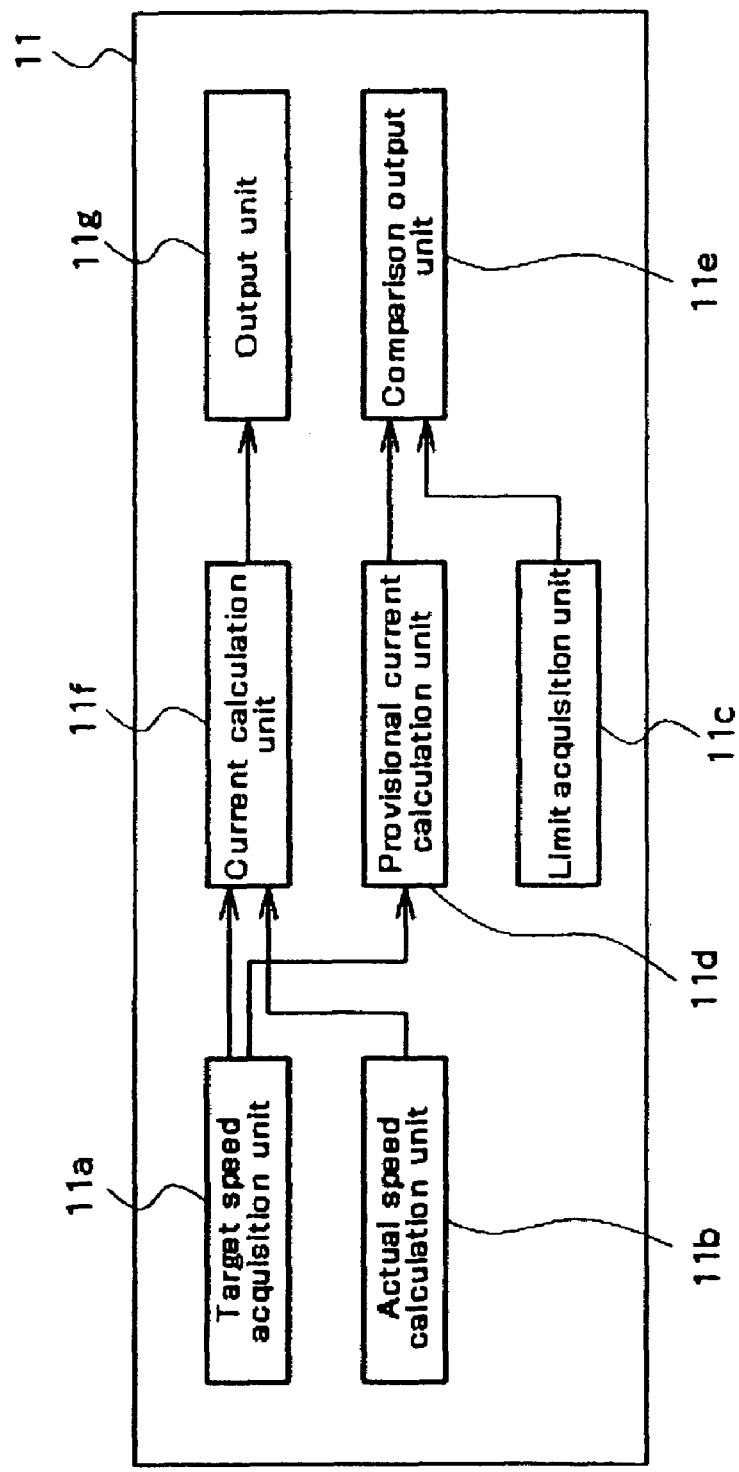
FIG. 2 is a functional block diagram of a control circuit included in the magnetic disk drive.

Here, the process carried out by the control circuit 11 will be described. The control circuit 11 functionally includes a target speed acquisition unit 11a, an actual speed calculation unit 11b, a limit acquisition unit 11c, a provisional current calculation unit 11d, a comparison output unit 11e, a current calculation unit 11f and an output unit 11g, as shown in FIG. 2.

The target speed acquisition unit 11a calculates the remaining distance to the target track at predetermined intervals based on the position information obtained from the read/write circuit 18. The target speed acquisition unit 11a determines the target speed of the magnetic head 14 according to the remaining distance.

More specifically, the target speed acquisition unit 11a sets a predetermined constant speed as the target speed in a zone in which the remaining distance is greater than a predetermined distance. In a zone in which the remaining distance is smaller than the predetermined distance, the target speed acquisition unit 11a regards this zone as a deceleration zone. In this zone, the target speed acquisition unit 11a sets, as the target speed, a speed defined by the function that decreases as the remaining distance decreases. The function is defined such that the differentiated value of the function is zero at a point where the remaining distance is equal to the predetermined distance.

Figure 3:
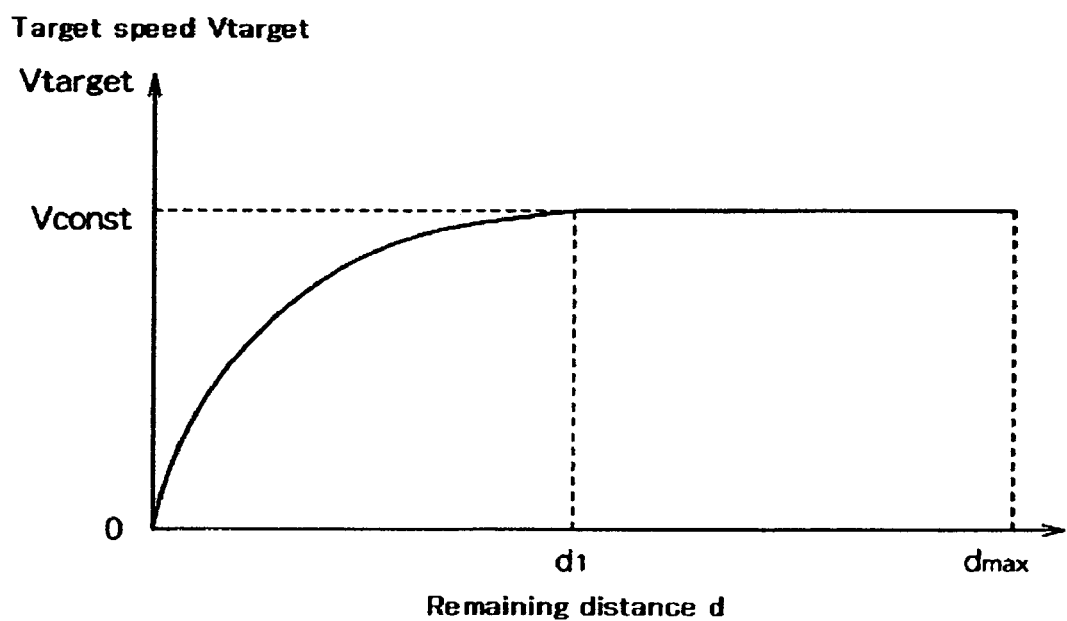
FIG. 3 is a graph showing an example of the change of a target speed versus a remaining distance between a magnetic head and a target track, with the horizontal axis representing the remaining distance and the vertical axis the target speed.

FIG. 3 is a graph showing an example of the change of a target speed Vtarget versus a remaining distance d. In the figure, the horizontal axis represents the remaining distance d, and the vertical axis the target speed Vtarget. In the graph, the target speed Vtarget is set to a constant speed Vconst until the remaining distance d equals a predetermined distance d1. Further, in the deceleration zone in which the remaining distance d is smaller than the predetermined distance d1, the target speed Vtarget is set to a speed defined by formula (1) shown below. The target speed Vtarget is defined such that it decreases as the remaining distance d decreases. In formula (1), factors k1 and k2 give a target speed Vtarget (d1)=Vconst and a differentiated value Vtarget' (d1)=0 of the target speed Vtarget at the predetermined distance d1. As a result, in a zone in which the remaining distance d is greater than the predetermined distance d1, the target speed Vtarget is set to the constant speed Vconst. This ensures smooth change of the target speed Vtarget from the constant speed Vconst to the target speed in the deceleration zone.

Formula 1

$$V\text{target}(d) = k1 \times \sqrt{d} - k2 \times d \quad (1)$$

It is to be noted that the function that defines the target speed Vtarget in the deceleration zone is not limited to formula (1). Formula (2) may also be used instead. Here, factors k3, k4 and k5 give the target speed Vtarget (d1)=Vconst and the differentiated value Vtarget' (d1)=0 of the target speed Vtarget (d) at the predetermined distance d1.

Formula 2

$$V\text{target}(d) = k3 \times \sqrt{d} - (k4 \times d^2 + k5 \times d) \quad (2)$$

For example, the target speed acquisition unit 11a calculates the target speed commensurate with the remaining distance based on the function described above. Alternatively, a target speed table associating the target speed defined by one of the aforementioned functions with the remaining distance, may be stored in the memory 12 so that the target speed acquisition unit 11a obtains the target speed commensurate with the remaining distance by referring to the target speed table.

The actual speed calculation unit 11b obtains position information of the magnetic head 14 and calculates the actual travel speed of the magnetic head 14 based on the displacement of the magnetic head 14 during one interval.

The provisional current calculation unit 11d calculates a provisional current of the drive power supplied to the VCM 15 (hereinafter referred to as provisional VCM current) at predetermined intervals in the acceleration zone adapted to accelerate the magnetic head 14 to the target speed. For example, the provisional current calculation unit 11d calculates a new provisional VCM current based on the error between the target speed and actual travel speed and the provisional VCM current calculated previously. Alternatively, the provisional current calculation unit 11d may set, as the provisional VCM current, the upper limit of current that can be output by the driver circuit 17 to the VCM 15.

The limit acquisition unit 11c obtains a limit of VCM current determined such that it increases as the elapsed time from the start of acceleration increases (hereinafter referred to as VCM current limit).

The limit acquisition unit 11c carries out, for example, a primary low-pass-filtering process at predetermined intervals based on a predetermined filtering factor to calculate a VCM current limit. More specifically, the limit acquisition unit 11c first obtains an initial value Clim(1) of a VCM current limit Clim(n) stored in advance in the memory 12. Then the limit acquisition unit 11c calculates a next VCM current limit Clim(2) based on the filtering factor and the initial value Clim(1).

The limit acquisition unit 11c sequentially calculates the next VCM current limit Clim(n) based on a previously calculated VCM current limit Clim(n−1) and the predetermined filtering factor. The limit acquisition unit 11c repeats this process until the VCM current limit Clim(n) reaches a predetermined specified value Cmax.

Figure 4:
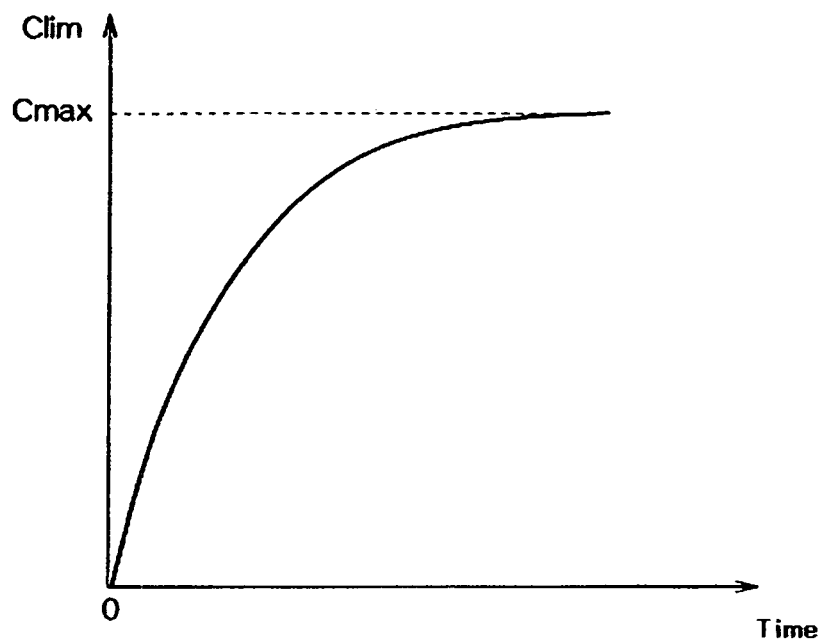
FIGS. 4($a$) and 4($b$) are graphs showing the change of a VCM current limit calculated by a low-pass-filtering process, with the horizontal axis representing an elapsed seek time and the vertical axis the VCM current limit.
Figure 4:
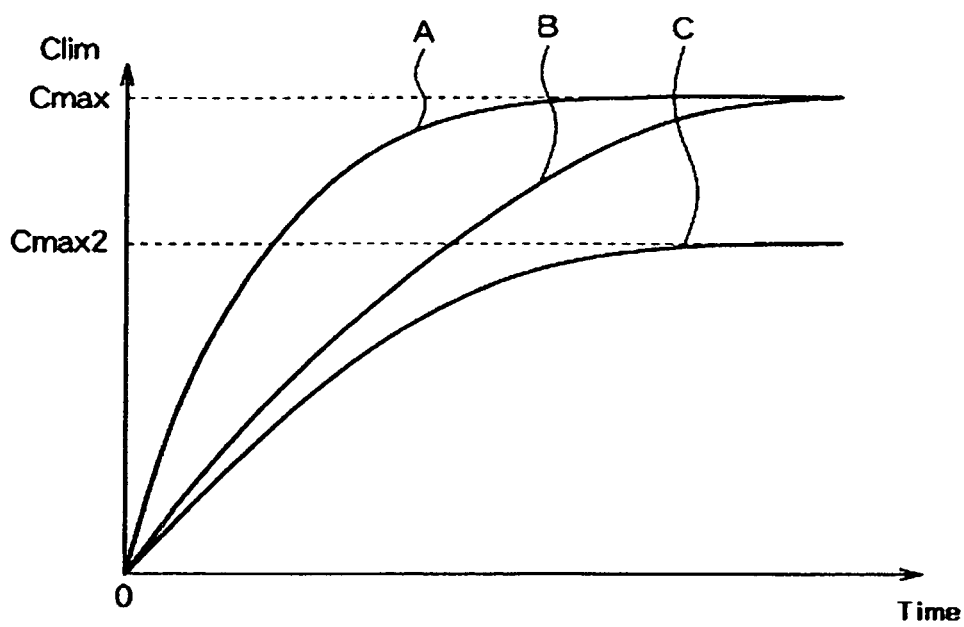

FIG. 4(a) is a graph showing the change of the VCM current limit Clim versus elapsed seek time. In the figure, the horizontal axis represents an elapsed seek time t, and the vertical axis represents the VCM current limit Clim. It is to be noted here that the VCM current limit Clim(n) is (a×Clim(n−1)+(1−a)×Cmax). This value is obtained by adding a predetermined value (product of the specified value Cmax and the predetermined filtering factor (1−a) in this case) to the product of the previously calculated VCM current limit Clim(n−1) and the predetermined filtering factor (factor a in this case). As shown in the figure, the VCM current limit increases gradually to the specified value Cmax over time.

It is to be noted that the limit acquisition unit 11c may carry out a high-order low-pass filtering process. That is, the limit acquisition unit 11c may calculate the next VCM current limit Clim(n) based not only on the VCM current limit Clim(n−1) calculated in the last process, but also a VCM current limit Clim(n−2) calculated in the process previous to the last process and a VCM current limit Clim(n−3) calculated in the process previous to the process previous to the last process.

Alternatively, the VCM current limit may be stored in advance in the memory 12. In this case, the limit acquisition unit 11c may sequentially read the VCM current limit from the memory 12 during the acceleration of the magnetic head 14.

Still alternatively, the magnetic disk drive 1 may be designed to select and execute one of a plurality of control modes that differ from each other in seek time of the magnetic head 14, and a plurality of sets of VCM current limits, each associated with a control mode, may be stored in advance in the memory 12. The magnetic disk drive 1 is set, for example, to high speed control mode with short seek time or low noise control mode with reduced seek noise as compared to the high speed control mode. The plurality of sets of VCM current limits, associated with the control modes, may be stored in advance in the memory 12. In this case, the limit acquisition unit 11c selects the set of VCM current limits associated with the control mode to be executed and sequentially reads the VCM current limits in the set from the memory 12.

FIG. 4(b) is a graph showing another example of the change of the VCM current limit Clim versus the elapsed seek time t. In the figure, line A represents, for example, the change of the VCM current limit in the high speed control mode. Line B, which is smaller in slope than the line A, represents, for example, the change of the VCM current limit in the low noise control mode. On the other hand, line C, which is smaller in slope than the line B and approaches a specified value Cmax2 which is smaller than the specified value Cmax, represents, for example, the change of the VCM current limit in an extra low noise control mode. The extra low noise control mode is designed to provide further reduced seek noise as compared to the low noise control mode that employs the VCM current limit shown by the line B. If a plurality of varying VCM current limits are stored in advance in the storage unit 12 as described above, the limit acquisition unit 11c selects one of the VCM current limits in accordance with the control mode to be executed.

Alternatively, a plurality of filtering factors associated with a plurality of control modes may be stored in advance in the memory 12. The limit acquisition unit 11c may select a filtering factor associated with the selected control mode and calculate the VCM current limit based on the selected filtering factor.

Still alternatively, when instructed by the host computer to write or read data, the limit acquisition unit 11c may calculate all the VCM current limits until the specified value Cmax is reached before the magnetic head 14 begins its acceleration, and temporarily store the limits in the memory 12. Then the limit acquisition unit 11c may sequentially read the stored VCM current limits at predetermined intervals during the acceleration of the magnetic head 14.

Still alternatively, the limit acquisition unit 11c may set, as the VCM current limit Clim, a value defined by a function having the elapsed seek time t as variable (e.g., trigonometric function such as sin (t) or arctan (t)).

The comparison output unit 11e compares the VCM current limit determined in the acceleration zone of the magnetic head 14 and a VCM provisional current. The comparison output unit 11e sets the smaller of the two values as the VCM current and outputs a digital signal representing the VCM current to the DAC 20. It is to be noted that the comparison output unit 11e may add a correction value, which is adapted to resist a bias force exerted on the magnetic head 14 during seek operation, to the smaller of the two values and set the resulting value as the VCM current. The bias force refers, for example, to a force exerted by air flow resulting from the rotation of the magnetic disk 13. Alternatively, the comparison output unit 11e may set the VCM provisional current as the VCM current when the difference between the VCM current limit and the VCM provisional current becomes smaller than a predetermined threshold value.

In the constant speed zone and the deceleration zone after the acceleration of the magnetic head 14 is terminated, the current calculation unit 11*f* calculates a new VCM current at predetermined intervals based on the error between the actual travel speed and the target speed of the magnetic head 14 and the previously calculated VCM current. It is to be noted that the current calculation unit 11*f* calculates a VCM current C(n) based on the remaining distance d when the remaining distance becomes smaller than the predetermined threshold value as the magnetic head 14 approaches the target track. As a result, control of the magnetic head 14 changes from speed control to position control.

The output unit 11*g* outputs a digital signal representing the VCM current calculated by the current calculation unit 11*f* to the DAC 20.

Figure 5:
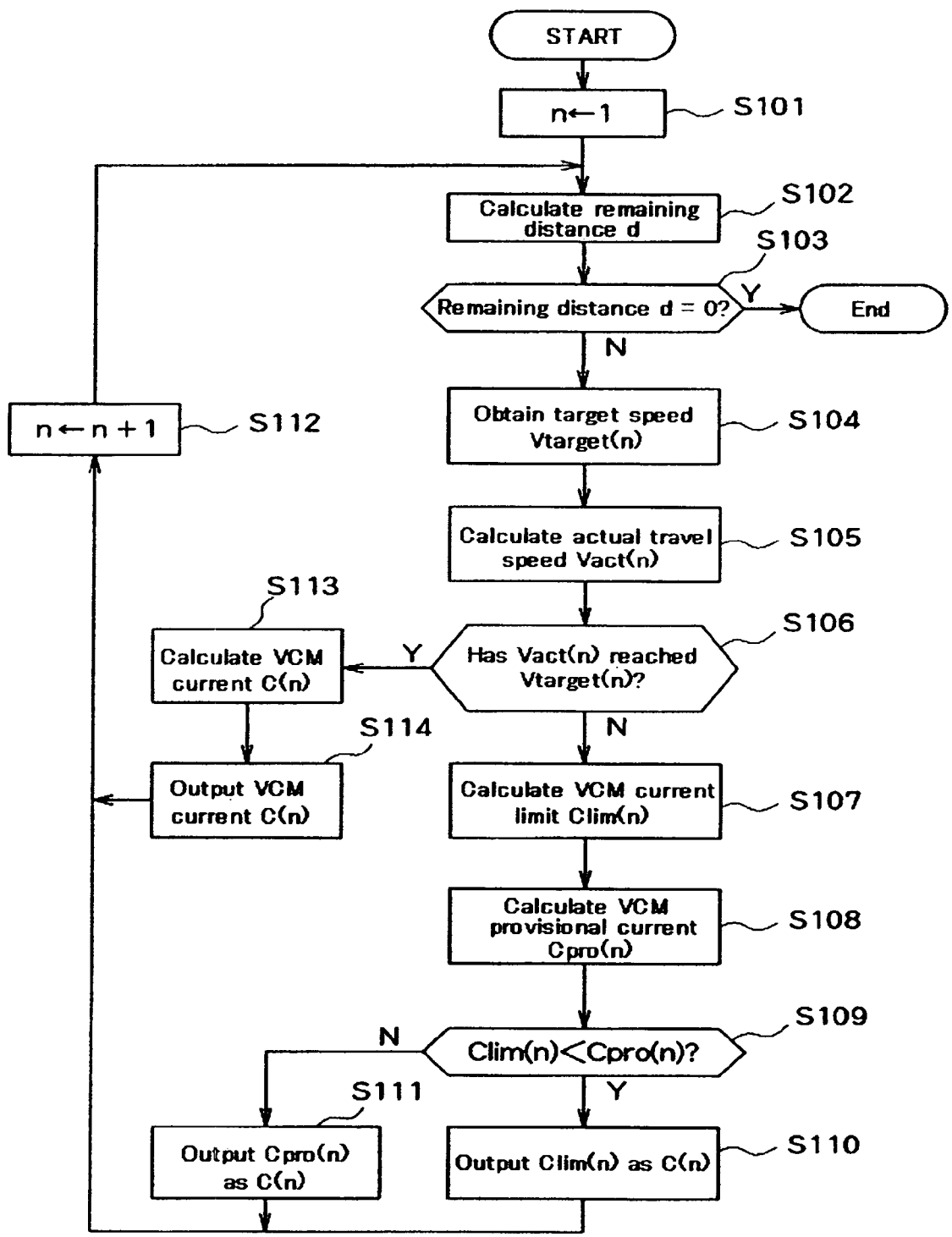
FIG. 5 is a flowchart showing an example of a process carried out by the control circuit according to embodiments of the present invention.

Here, a description will be made of the flow of the process carried out by the control circuit 11 during seek operation of the magnetic head 14 with reference to the flowchart in FIG. 5. It is to be noted that the description will be made assuming that a target speed table associating the remaining distance and the target speed is stored in the memory 12, and that the target speed changes with change in the remaining distance as shown in the graph of FIG. 3.

When receiving address information of data write or read destination from the interface circuit 19, the control circuit 11 sets a parameter n to an initial value of 1 first (S101). Further, the control circuit 11 obtains position information from the read/write circuit 18 to calculate the remaining distance d to the target track (S102). Then the control circuit 111 determines whether or not the remaining distance d is zero (S103). Here, if the remaining distance d is already zero as when the track over which the magnetic head 14 is located is the same as the target track, the control circuit 11 terminates the process. On the other hand, when the magnetic head 14 reaches the target track as a result of the process described below, and therefore the remaining distance d is zero, the control circuit 11 terminates the process. It is to be noted that, at the completion of seek operation, the control circuit 11 switches to the publicly known track following process in which the control circuit 11 controls the position of the magnetic head 14 so that the head follows the target track.

If the remaining distance d is not zero in S103, the target speed acquisition unit 11*a* refers to the aforementioned target speed table to obtain a target speed Vtarget(n) associated with the remaining distance d to the target track (S104). Here, the target speed Vtarget(n) is set to the predetermined constant speed Vconst when the remaining distance d is greater than the predetermined distance d1. The target speed Vtarget(n) is set to a speed defined by a function (e.g., formula (1) or (2)) that decreases as the remaining distance d decreases when the remaining distance d is smaller than the predetermined distance d1.

On the other hand, the actual speed calculation unit 11*b* calculates an actual travel speed Vact(n) of the magnetic head 14 based on input position information from the read/write circuit 18 (S105). It is to be noted that the actual speed calculation unit 11*b* sets zero as the initial value of the travel speed Vact(n) at the start of seek operation.

Then the control circuit 11 determines whether the actual travel speed Vact(n) has reached the target speed Vtarget(n) (S106). To accomplish this, the control circuit 11, for example, determines whether the value, obtained by subtracting the actual travel speed Vact (n) from the target speed Vtarget(n), is smaller than the predetermined threshold value.

Here, if the actual travel speed Vact(n) has yet to reach the target speed Vtarget(n), the limit acquisition unit 11*c* calculates the VCM current limit Clim(n) (S107). The limit acquisition unit 11*c* sets, for example, (a1×Cmax+a2×Clim(n−1)) as the VCM current limit Clim(n). The value (a1×Cmax+a2×Clim(n−1)) is obtained by adding the product of the VCM current limit Clim(n−1) and the predetermined filtering factor (a2 in this case) to the product of the current upper limit Cmax that can be output by the driver circuit 17 and the predetermined filtering factor (a1 in this case). Here, the VCM current limit Clim(n−1) is the previously calculated VCM current limit, and Clim(0), which is the initial value of the VCM current limit, is a predetermined value.

The provisional current calculation unit 11*d* calculates a VCM temporary current Cpro(n) based on an error Verror(n) between the actual travel speed Vact (n) and the target speed Vtarget(n) of the magnetic head 14 (S108). The provisional current calculation unit 11*d* may set, for example, (b1×Verror(n)+b2×Cpro(n−1)) as a new VCM provisional current Cpro(n). The value (b1×Verror(n)+b2×Cpro(n−1)) is obtained by adding the product of a previously calculated VCM provisional current Cpro (n−1) and a predetermined filtering factor b2 to the product of the error Verror(n) and a predetermined filtering factor b1. Alternatively, the provisional current calculation unit 11*d* may set, as the VCM provisional current Cpro(n), the current upper limit Cmax that can be output by the driver circuit 17.

The comparison output unit 11*e* compares the VCM current limit Clim(n) and the VCM provisional current Cpro(n) (S109). Here, when the VCM current limit Clim(n) is smaller than the VCM provisional current Cpro(n), the comparison output unit 11*e* sets the VCM current limit Clim(n) as the VCM current C(n) and outputs a digital signal representing the VCM current C(n) to the DAC 20 (S110). On the other hand, when the VCM provisional current Cpro(n) is smaller than the VCM current limit Clim(n), the comparison output unit 11*e* sets the VCM provisional current Cpro(n) as the VCM current C(n) and outputs a digital signal representing the VCM current C(n) to the DAC 20 (S111).

The control circuit 11 increments the parameter n (S112) and returns to S102 to recalculate the remaining distance d to the target track based on the input position information from the read/write circuit 18 after a predetermined interval elapses.

When the actual travel speed Vact(n) reaches the target speed Vtarget(n) in S106, the control is switched from acceleration control described up to this point in which the VCM current is limited by the VCM current limit Clim(n), over to constant speed or deceleration control with no such limitation.

More specifically, the current calculation unit 11*f* calculates the VCM current C(n) based on the error Verror between the actual travel speed Vact(n) and the target speed Vtarget(n) of the magnetic head 14 (S113). The current calculation unit 11*f* sets, for example, (c1×Verror(n)+c2×C(n−1)) as the new VCM current C(n) as with the provisional current calculation unit 11*d*. The value (c1×Verror(n)+c2×C(n−1)) is obtained by adding the product of the previously calculated VCM current C(n−1) and a predetermined filtering factor c2 to the product of the error Verror(n) and a predetermined filtering factor c1. It is to be noted that when the remaining distance d becomes smaller than the predetermined threshold value as the magnetic head 14 approaches the target track, the current calculation unit 11*f* calculates the VCM current C(n) based on the remaining distance d. This switches the control by the control circuit 11 from speed control in which the VCM current C(n) is calculated based on the error Verror, over to position control in which the VCM current C(n) is calculated based on the remaining distance d. The output unit 11g outputs a digital signal representing the VCM current C(n) calculated in S113 to the DAC 20 (S114). The control circuit 11 increments the parameter n (S112) and returns to S102 to repeat the process from this point onward until the remaining distance d becomes zero.

It is to be noted that in the process described above, the control circuit 11 determines whether the actual speed of the magnetic head 14 has reached the target speed in S106. When the actual speed has reached the target speed, the control circuit 11 proceeds to S113 and S114 where the circuit carries out the process in the constant speed zone or deceleration zone. However, the control circuit 11 may alternatively carry out the process from S107 onward in the constant speed and deceleration zones without making any determination in S106. In this case, the limit acquisition unit 11c calculates the VCM current limit Clim(n) in S107, and the provisional current calculation unit 11d calculates the VCM provisional current Cpro(n) in S108 in the constant speed and deceleration zones as well. In the constant speed zone, the target speed Vconst remains unchanged. The difference between the actual travel speed Vact(n) and the target speed Vconst of the magnetic head 14 is small. As a result, the VCM provisional current Cpro(n) is smaller than during acceleration. In the deceleration zone, on the other hand, a current flows through the VCM 15 in an opposite direction to that in the acceleration zone. As a result, the VCM provisional current Cpro(n) is opposite in polarity to the VCM current limit Clim(n). In these zones, therefore, the VCM provisional current Cpro(n) eventually becomes smaller than the VCM current limit Clim(n). The comparison output unit 11e outputs a digital signal representing the VCM provisional current Cpro(n) to the DAC 20 in S111.

Figure 6A:
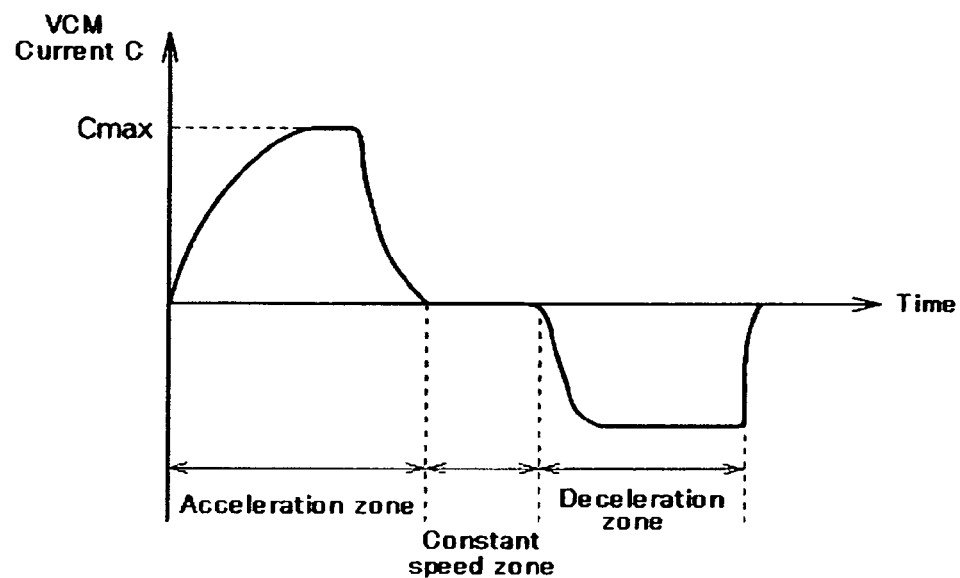
FIGS. 6($a$) and 6($b$) are graphs showing the results of the process carried out by the control circuit according to embodiments of the present invention.
Figure 6B:
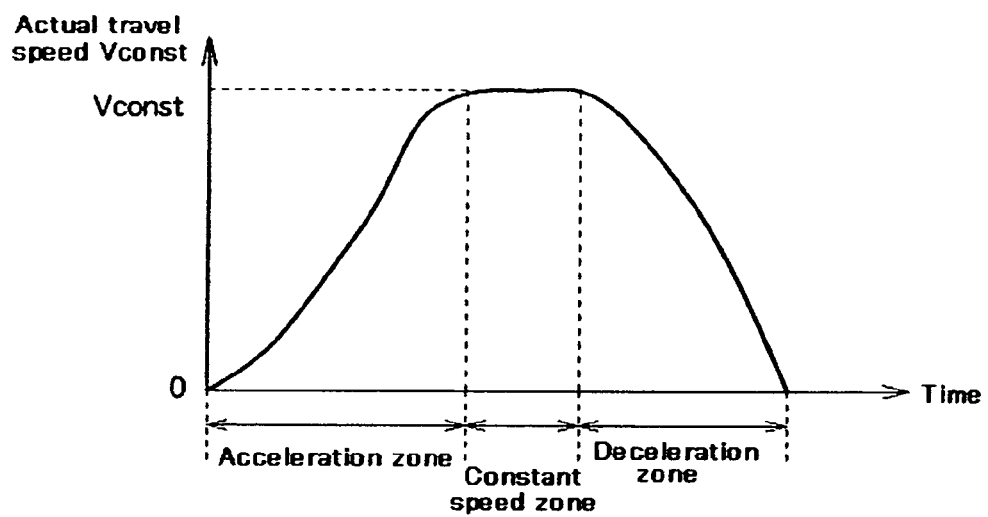

In the end, a description will be made of the results of the process described above carried out by the control circuit 11. FIG. 6(a) is a graph showing an example of the change of the VCM current C versus the seek time t. FIG. 6(b) is a graph showing the change of the actual travel speed of the magnetic head 14 versus the seek time t. It is to be noted that the horizontal axis represents the seek time in FIGS. 6(a) and 6(b), and that the vertical axis in FIG. 6(a) represents the VCM current C. On the other hand, the vertical axis in FIG. 6(b) represents the actual speed of the magnetic head 14.

Figure 7A:
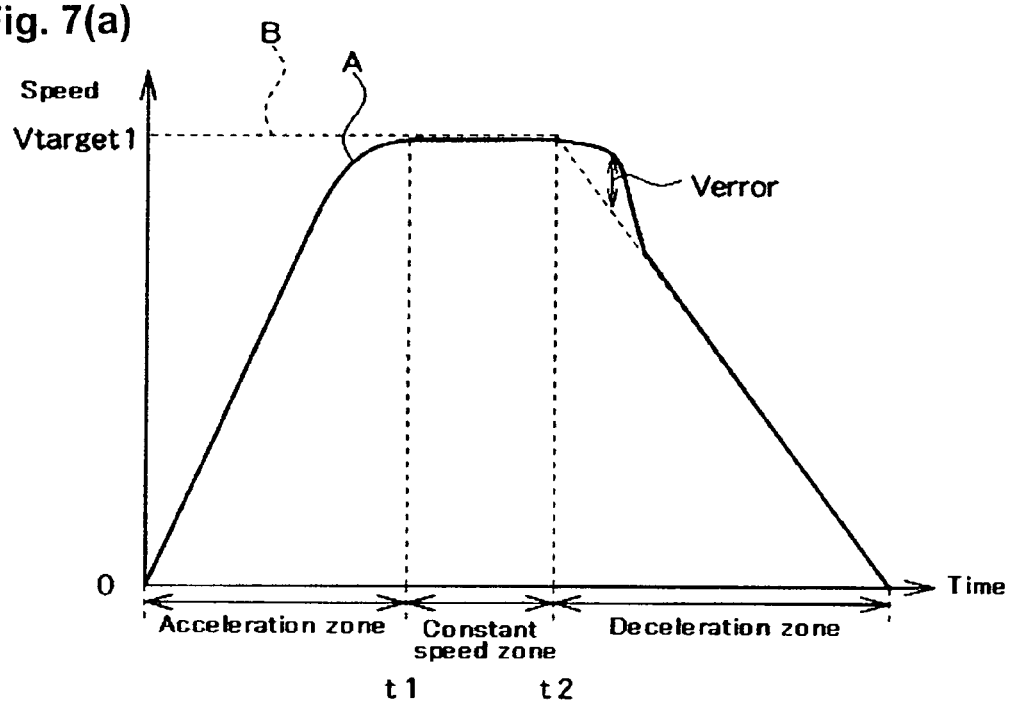
FIG. 7($a$) is a graph showing the change of actual travel and target speeds of the magnetic head versus the seek time, and FIG. 7($b$) is a graph showing the change of a drive current of a voice coil motor versus the seek time.
Figure 7B:
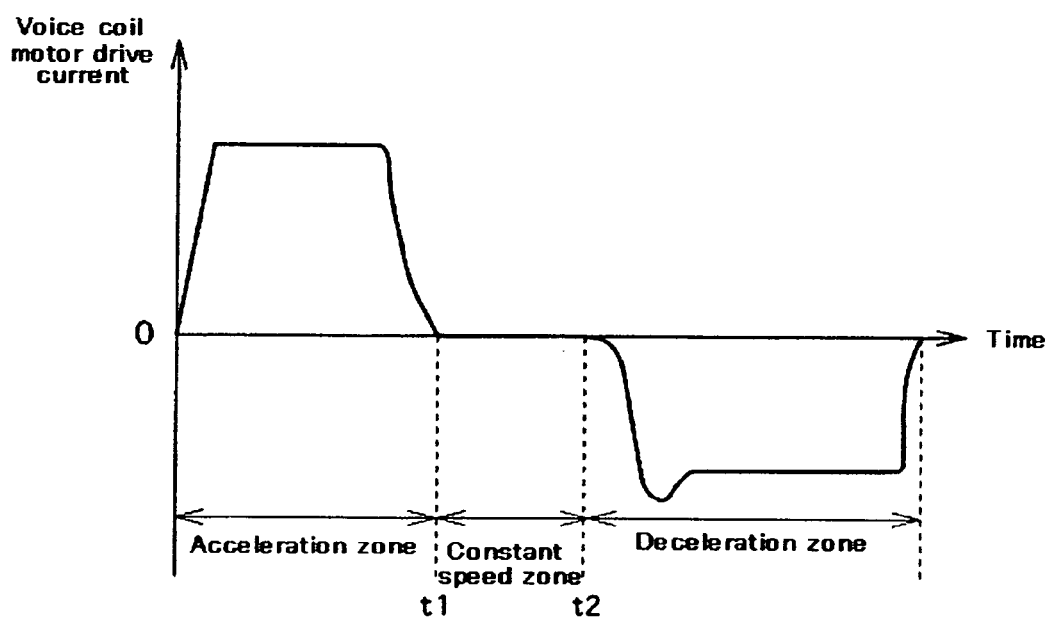

In the acceleration zone, the predetermined constant speed Vconst is set as the target speed. As a result, the speed of the magnetic head 14 increases from zero to the constant speed Vconst as shown in FIG. 6(b). During this acceleration, the smaller of the VCM current limit and the VCM provisional current is output. Therefore, the VCM current shown in FIG. 6(a) rises to the specified value Cmax more smoothly as compared to the VCM current in a conventional magnetic disk drive (refer to FIG. 7(b)). After reaching the specified value Cmax, the VCM current drops at a rate of change greater than when it rises.

In the constant speed zone, the VCM current is zero as shown in FIG. 6(a). As a result, the magnetic head 14 maintains the speed Vconst as shown in FIG. 6(b). It is to be noted that if a correction value including the aforementioned bias force is added to the VCM current, the VCM current is higher than zero by the correction value in the constant speed zone.

In the deceleration zone, a speed defined, for example, by the function shown in the graph of FIG. 3 is set as the target speed. Therefore, the VCM current in FIG. 6(a) rises more smoothly at the transition from the constant speed zone to the deceleration zone as compared to the VCM current in a conventional magnetic disk drive (refer to FIG. 7(b)). As a result, the speed of the magnetic head 14 begins to drop smoothly from the constant speed Vconst. As the magnetic head 14 approaches the target track, the VCM current drops to zero at a rate of change greater than when it rises.

In the magnetic disk drive 1 described above, the control circuit 11 determines the VCM provisional current in accordance with the difference between the target and actual travel speeds of the magnetic head 14 in the acceleration zone adapted to accelerate the magnetic head 14 to the target speed. When the VCM provisional current exceeds the VCM current limit, the control circuit 11 outputs the VCM current limit to the driver circuit 17 via the DAC 20 as the current of the drive power supplied to the VCM 15. This suppresses abrupt motion of the magnetic head 14, thus ensuring reduced seek noise. On the other hand, the target speed acquisition unit 11a sets the constant speed as the target speed in the constant speed zone which lasts until the remaining distance d reaches the predetermined distance d1. In the deceleration zone in which the remaining distance d is smaller than the predetermined distance d1, the target speed acquisition unit 11a sets, as the target speed, a speed defined by a function that decreases with decrease in the remaining distance d. The function is defined such that the differentiated value of the function is substantially zero at a point where the remaining distance d is equal to the distance d1. This ensures smooth change of the target speed, suppressing abrupt motion of the magnetic head 14 and reducing seek noise. In the magnetic disk drive of one embodiment of the present invention, seek noise at different frequencies in the audible frequency band has been reduced by several decibels more than in a magnetic disk drive to which embodiments of the present invention are not applied.

Further, the output signal from the control circuit 11 to the DAC 20 does not pass through a low-pass filter. This ensures fast control response following the completion of acceleration.

It is to be noted that the present invention is not limited to the embodiments described above but may be modified in various ways. For example, the control circuit 11 controls the current of the drive power supplied to the VCM 15 in the magnetic disk drive 1 described above. Instead, the control circuit 11 may control the voltage of the drive power so as to bring the travel speed of the magnetic head 14 closer to the target speed. Alternatively, the control circuit 11 may limit the current of the drive power supplied to the VCM 15 by calculating the upper or lower limit of the voltage of the voltage signal output by the DAC 20 to the driver circuit 17.

Although seek operation of the magnetic head 14 in a single direction has been described in the above description, embodiments of the present invention are applicable to a seek operation in the opposite direction. During a seek operation in the opposite direction, the limit acquisition unit 11c obtains a negative VCM current limit which will serve as the lower limit of the VCM current.

What is claimed is:

1. A magnetic disk drive including:
   a magnetic disk;
   a magnetic head adapted to access a target track formed on the magnetic disk to write or read information;
   a voice coil motor adapted to produce a drive force applied to the magnetic head; and
   a control circuit adapted to control a drive power supplied to the voice coil motor so as to bring the travel speed of the magnetic head close to a predetermined target speed during a seek operation adapted to move the magnetic head over the target track;

wherein the control circuit determines a provisional current or voltage in accordance with the difference between the predetermined target speed and the actual travel speed in an acceleration zone adapted to accelerate the magnetic head to the predetermined target speed, and wherein if the provisional current or voltage exceeds a limit that is sequentially calculated and increases as an elapsed time from the start of acceleration increases, the control circuit sets the limit as a current or voltage of a drive power supplied to the voice coil motor to control the motor;

wherein if the limit exceeds the provisional current or voltage, the control circuit sets the provisional current or voltage as the current or voltage of the drive power supplied to the voice coil motor to control the motor.

2. The magnetic disk drive of claim 1, wherein the limit in the acceleration zone is calculated by a low-pass filtering process.

3. The magnetic disk drive of claim 1, wherein the limit is calculated in advance for each of a plurality of control modes having seek times of the magnetic head different from each other, the magnetic disk drive further comprising:

a memory adapted to record the limits, wherein the control circuit selectively reads the limit commensurate with the control mode to be executed from the memory and controls the acceleration of the magnetic head by using the read limit.

* * * * *